Patented Jan. 30, 1945

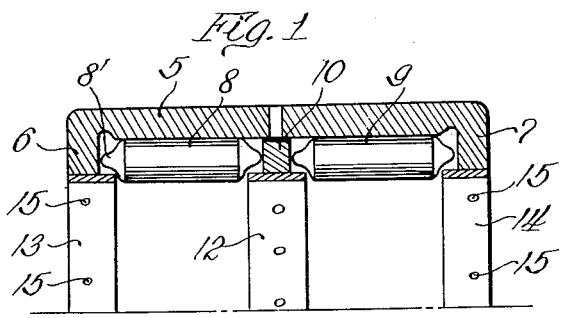
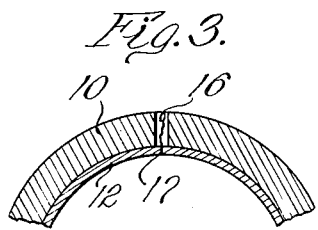
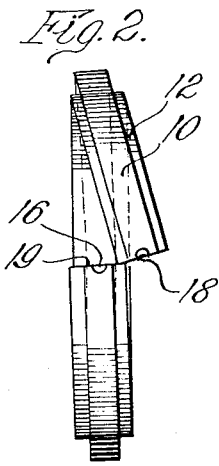
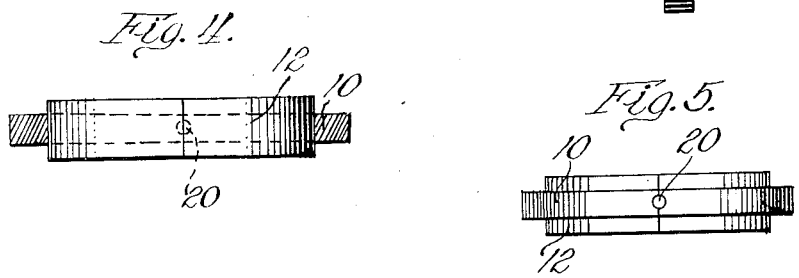
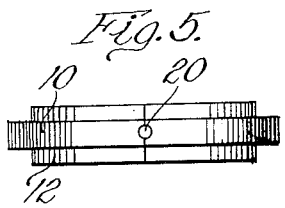

2,368,175

UNITED STATES PATENT OFFICE 2,368,175

NEEDLE ROLLER CONSTRUCTION

Stanley R. Thomas, Lyons, Mich., assignor to The Torrington Company, South Bend, Ind., a corporation of Indiana Application June 11, 1942, Serial No. 446,652

8 Claims. (Cl. 308—214)

This invention relates to a needle bearing construction, and more particularly is concerned with a multiple row needle bearing construction having integrally flanged race members.

In providing needle bearings for various types of installation, it has been found necessary under some conditions to provide multiple rows of needles for adequate bearing capacity. This has, to a large extent, resulted in numerous difficulties due to the inability to provide an intermediate separating member between the axially adjacent rows of needle rollers. Numerous attempts have been made to solve this difficulty, but have proven unsatisfactory in general since a split type ring, even if capable of being introduced into position between adjacent series of needle rollers, has sharp edges which can be caught by the trunnion ends of the needles skewing the rollers and thus damaging the bearing.

Other attempts to solve this problem have been the elimination of the integral flanges on the race members with some means provided for subsequently staking, welding, or otherwise attaching an outer flange member in position. However, none of these methods with which I am familiar for constructing a multiple row needle bearing have been satisfactory, and it is the primary object of the present invention to improve upon and provide an efficient and economical multiple row needle bearing construction in which the race member is provided with integral end flanges.

Another object of the present invention is to provide a spacing member intermediate adjacent series of needle rollers, which is so designed that there will be no interference with the rollers that would cause them to skew or move out of position, and yet will provide the necessary retainment of the rollers against radial displacement so that the construction when assembled provides a self-contained full complement type of needle roller bearing.

In practicing the present invention, I provide a ring member which is ground to proper size to fit within the outer race member, the ring having slight clearance in the bore of the raceway. Welded to the internal face of this ring is a retaining band, which may be formed of flat strip stock of spring steel cut to proper length, wrapped in position on the inner face of the ring, and then welded thereto. The ring is then broken at the point where the butt ends are in engagement, and is threaded into the outer bearing race in a manner similar to that in which a snap ring is threaded into position. Due to the breaking of the ring at the point noted, one end of the ring can be displaced axially so that it will wind through the flange end of the raceway and into position within the raceway. The ring then springs back into alinement, and a suitable locking mechanism is provided at the breaking point. The ring is then made into an integral member which serves as a loose separator and retaining member within the bearing race.

Thus, it will be seen that the present invention refers particularly to a construction and means for providing the equivalent of a one-piece spacing and needle retaining ring within a cylindrical bearing outer raceway having integrally formed end flanges whose internal diameters are less than that of the raceway. Obviously, the same invention would be applicable to constructions where the needle retainment is made to an inner race member, or to a bearing having three or more rows of rollers.

With the present construction, it is possible to provide a multiple row needle bearing of adequate capacity having all the features of self-retainment and integrally flanged race member, but which yet can be manufactured and assembled at relatively low cost. In this connection, an additional advantage is that it allows grinding of the hardened faces of the ring and flanges abutting the roller ends.

Other objects and advantages of the present invention will appear more fully from the following detailed description, which, taken in conjunction with the accompanying drawing, will disclose to those skilled in the art the particular construction and operation of a preferred form of the present invention.

In the drawing:

Figure 1 is a sectional view through a bearing assembly constructed in accordance with the present invention;

Figure 2 is an elevational view of the intermediate ring member showing the manner in which it is distorted to wind it into position in the race;

Figure 3 is a longitudinal sectional view through the ring member;

Figure 4 is a fragmentary internal end view of the structure shown in Figure 3 showing the interior of the ring member at the point of break; and Figure 5 is a fragmentary external view corresponding to Figure 4 with the ring member assembled in final position.

Referring now in detail to Figure 1, I have provided the outer race member 5 which is formed with the integral radially inwardly turned end flanges 6 and 7, these end flanges being formed on the ends of the raceway 5 to provide axial retainment of the needle rollers 8 and 9, it being understood that the rollers 8 constitute a circumferential series of rollers, and that the rollers 9 constitute a second axially spaced circumferential series of rollers. Disposed intermediate the roller series 8 and 9 is an intermediate spacing ring 10 carrying on its inner face the retaining band 12. Each of the flanges 6 and 7 carries upon its inner face a corresponding retaining band 13 and 14. The manner in which the retaining bands 13 and 14 are attached to the flanges 6 and 7 is disclosed clearly in the patent to Harold Frauenthal and myself, No. 2,268,745, issued January 6, 1942, it being understood that the bands 13 and 14 are formed from flat strip stock which is cut to length, rolled into position on the face of the flanges 6 and 7, and then spot welded to these flanges, as indicated at 15.

However, in the assembly of a multiple row needle being, in accordance with the present invention, after the race member 5 has been formed, one of the flanges, such as the flange 6, is provided with the retaining band 13.

In order to enable the spacing band 10 to be inserted into position, the ring is first turned to size for grinding, and a hole, such as indicated at 16 in Figure 3, is drilled radially therethrough. The ring is then hardened in any desired manner, and is ground to the finished size, providing a slight clearance in the bore of the raceway. The retainer band 12 comprising a strip of flat spring stock cut to length and rolled into position on the inner race of the ring 10 is so arranged that the butt ends thereof, indicated at 17, engage each other in alinement with the hole 16. Then, with the use of a suitable tool pressed into the hole 16, the ring is broken transversely as is shown in Figure 2, the broken ends being indicated at 18 and 19. With the ring broken in this manner, the ends of the ring may be sprung out of alinement, as shown in Figure 2, and the ring and band assembly is wound into the bore of the raceway. After being introduced into the raceway between the flanges 6 and 7, the ring is turned at a 90 degree angle to the plane of the end flange. In this position, the hole 16 is exposed at one end of the raceway and a brass pin, indicated at 20, is inserted into the hole when the two ends of the ring have been sprung back into alinement. This brass pin is then fused in place with solder, or brazed. The ring in its completely assembled position is then swung into a position paralleling the flange 6 but adjacent the flange 7. The series of rollers 8 are then introduced into the raceway with the trunnion ends 8' thereof, engaged in the channel formed by the overhang of the retaining band 13 with respect to the flange 6. With the rollers 8 in position, the ring 10 is moved down into position against the opposite ends of the rollers 8, it being apparent that the overhang of the spacing band 12 with respect to the ring 10 forms a retainment for the opposite trunnion ends of the rollers. The rollers 9 are then introduced into position on the opposite side of the ring 10, and when completely assembled, the retaining band 14 is positioned on the flange 7 with its ends in abutment, and is then welded in position, as indicated at 15, thereby providing a completely retained multiple row needle bearing assembly which is simple to construct and which provides proper needle retainment and proper spacing of the series of needle rollers.

I have found that in the manufacture of this type of bearing, it is possible to provide a substantially clean transverse break across the hardened ring member 10 by the use of the drilled hole 16. This break, when made, allows the ring to be distorted with the ends out of alinement so that, in effect, it can be threaded or wound through the flange 6 or 7 into position, and when turned at right angles, it is an easy matter to spring the two ends of the ring back into alinement. However, to insure against any possibility of these ends ever snapping out of alinement again, I insert the brass pin into the hole, which pin, when positioned, forms a locking key preventing any possibility of the two ends of the ring again snapping out of alinement.

So far as the positioning of the retaining bands 12, 13 and 14 in position on the end flanges and spacing ring, this particular feature of the invention is fully described in the patent above-referred to, but indicates how the combination of this method of assembling a retaining band can be employed in conjunction with the use of an intermediate spacer ring in a multiple row needle bearing construction to provide a simple but adequate self-retained bearing construction.

I am aware that various changes may be made in certain features of the present construction, and I therefore do not intend to be limited, except as defined by the scope and spirit of the appended claims.

I claim:

1. A multiple row needle bearing assembly comprising an outer race having radially inturned end flanges, an intermediate annular spacer ring of a diameter larger than the internal diameter of said flanges, a split retainer band welded to the inner face of said ring and overhanging the edges thereof, said ring having a radial hole therein at the point of abutment of the ends of said band providing a break point whereby the ring when broken may have its ends displaced laterally to be wound into position within said race, pin means for rejoining the ends of said ring to provide a unitary member within said race, each of said flanges having a needle roller retaining band on the inner axial face thereof overhanging the inner radial face of said flange, and two sets of needle rollers in said race axially spaced by said ring and confined radially by said bands.

2. A multiple row needle bearing assembly comprising an outer race member having radially inturned end flanges defining a smooth cylindrical raceway therebetween, a retaining band secured on the inner axial face of each flange and overhanging the inner radial face thereof, an annular ring separator of a uniform outer diameter slightly less than that of said raceway axially movable thereon, said separator including a retainer band on the inner face thereof overhanging the lateral faces of said separator, and two series of needle rollers in said race spaced apart by said separator and confined radially by said retaining bands.

3. A multiple row needle bearing assembly comprising a race member having radially directed end flanges defining therebetween a smooth cylindrical raceway, each of said flanges having a retaining band secured thereon and overhanging said raceway, a separator ring axially movable on said raceway and having a retaining band secured thereto overhanging both lateral faces of said ring, and separate series of needle rollers on said raceway spaced apart axially by said ring and confined against displacement by said bands.

4. A spacer ring for a multiple row needle bearing assembly comprising a ring member machined on one axial face to fit closely on the bearing raceway, said ring having a radial hole therethrough, said ring being broken transversely at said hole to accommodate offsetting of the ends thereof for insertion into a flanged bearing race, and pin means secured in said hole for maintaining said ends in alignment.

5. The ring of claim 4 further characterized in the provision of a split retaining band secured to the other axial face of said ring with the ends abutting at said hole, said band overhanging both lateral faces of said ring.

6. A multiple row needle bearing assembly comprising a race member having radially inturned end flanges defining a smooth cylindrical raceway therebetween, separate series of needle rollers adapted to be arranged in axially spaced relation on said raceway, separating means between adjacent series of rollers comprising a hardened and ground ring member of an outer diameter substantially equal to that of said raceway, said ring being broken transversely to wind it into said raceway between said flanges, and means interlocking the adjacent ends of said split ring after insertion in said raceway to make it a unitary ring.

7. A multiple row needle bearing assembly comprising a bearing race having normally directed end flanges defining therebetween a bearing raceway, a separator ring having means therein providing a break point whereby the ring when broken may have its ends displaced laterally to be wound past one of said flanges into position on said raceway, means between said broken ends rejoining the ends of said ring to provide a unitary member axially movable along said raceway, and two sets of needle rollers on said raceway axially spaced by said ring.

8. A multiple row needle bearing assembly comprising a bearing race having radially inwardly directed end flanges defining therebetween a bearing raceway, a separator ring of a uniform outer diameter greater than the inner diameter of said flanges but slightly less than the diameter of said raceway, said ring being transversely broken to allow offsetting of the broken ends for winding said ring past one of said flanges into said raceway, means between the broken ends of said ring rejoining said ends to provide a unitary member axially slidable on said raceway, and two sets of needle rollers on said raceway axially spaced by said ring.

STANLEY R. THOMAS.